July 13, 1937. L. H. REZOS 2,087,117

SANITARY BUTTER CONTAINER

Original Filed Aug. 23, 1934   2 Sheets-Sheet 1

Inventor
Louis H. Rezos,
Milburn & Milburn
Attorneys

July 13, 1937.  L. H. REZOS  2,087,117
SANITARY BUTTER CONTAINER
Original Filed Aug. 23, 1934   2 Sheets-Sheet 2
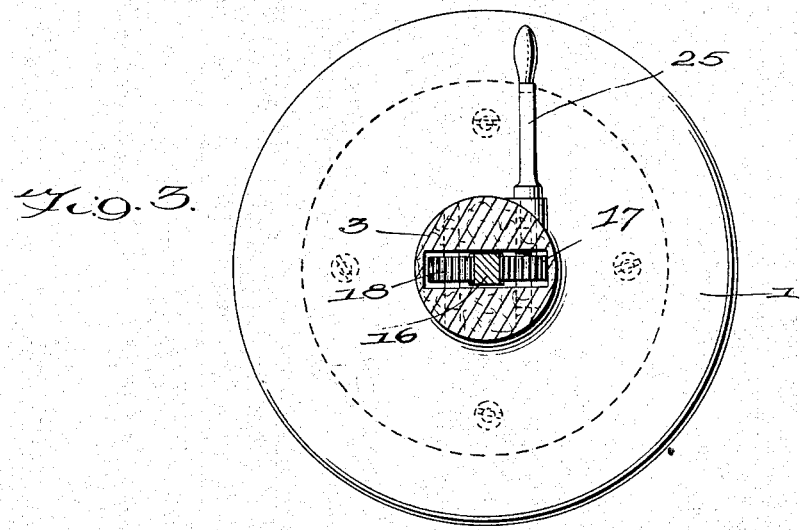
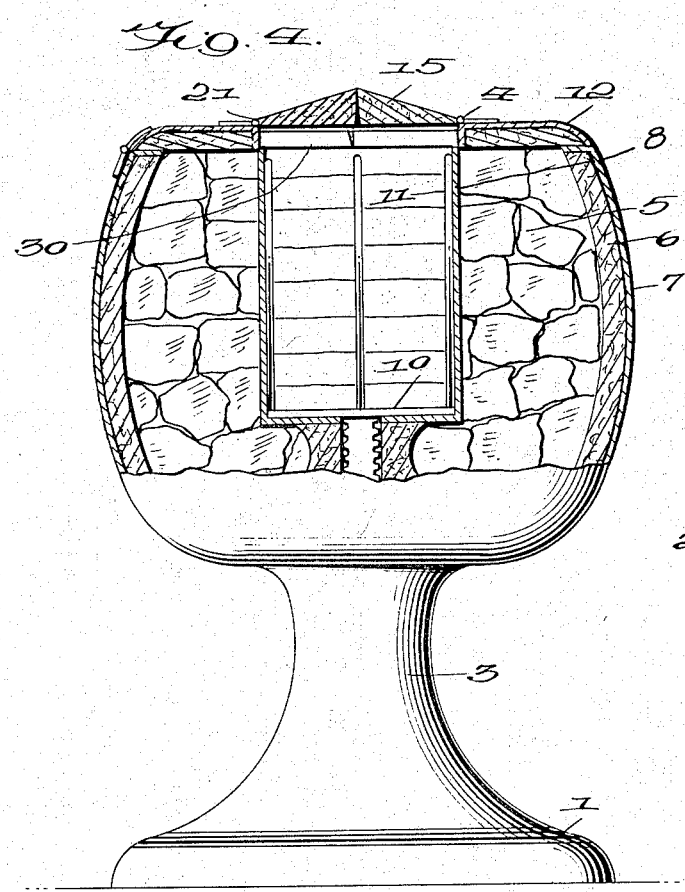
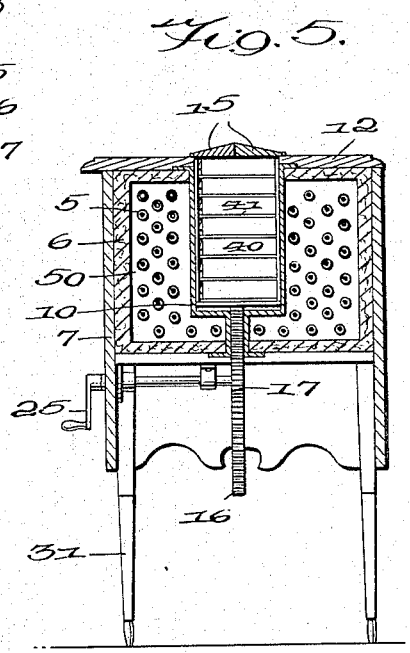
Inventor
Louis H. Rezos,

UNITED STATES PATENT OFFICE 2,087,117

SANITARY BUTTER CONTAINER

Louis H. Rezos, Clarendon, Va., assignor to Arta Corporation of America, Washington, D. C., a corporation of Delaware Application August 23, 1934, Serial No. 741,162
Renewed July 25, 1936

2 Claims. (Cl. 62—10)

This invention relates to butter dishes and similar food containers suitable for table, household and restaurant use and particularly to containers of this kind so constructed and designed as to afford an enclosed sanitary storage chamber in which butter may be kept in good condition and from which it may readily be removed when desired.

The methods heretofore generally employed in the cooling and serving of butter, particularly in hotels and restaurants, have been inconvenient and unsanitary. Some attempts have been made to provide butter dishes for household table use which would protect the butter from dust, flies, and insects and crude efforts have also been made to keep the butter cool by means of an ice chamber beneath the tray or plate or in the cover of the dish. The usual practice, however, is merely to place pieces of ice on or around the pat of butter, or, particularly in hotels and restaurants, to pack a large number of pieces of butter in a bowl with numerous cubes or pieces of ice, the butter, as it is served, being removed from the mixture of butter, ice and water in the bowl by the fingers of the waiter or waiters.

These methods, although extremely crude and unsanitary, are in common and practically universal use today.

One of the principal objects of my invention is to render these objectionable methods unnecessary by providing a container which will completely enclose the butter and prevent its contamination by dust, dirt and insects, which will keep the butter cool and firm until served, and from which the butter may be quickly and conveniently removed in small or large quantity as desired.

Another object of the invention is the provision of a container in which butter and other articles of food or drink may be stored in an enclosed chamber and the portion thereof desired to be served ejected therefrom by manually operable means.

A further object of the invention is the provision of a butter dish with an enclosed butter chamber from which butter may be dispensed as desired and sliced as it is dispensed.

A further object of the invention is the provision of a butter dish adapted to be placed upon a table, which will preserve the butter in sanitary condition and from which butter may be easily and quickly obtained by persons seated at the table.

A still further object of the invention is the provision of a butter dish of attractive design for table use but including in its structure a double-walled heat-insulating chamber for cooling purposes, a storage chamber enclosed thereby, a supporting pan or tray slidably positioned in the storage chamber, and means by which the slidable tray may be advanced to present any desired quantity of butter for serving or withdrawn into the chamber for storage and cooling until a further quantity is desired.

With these objects in view I have provided a device which, although simple in construction and economical to manufacture, combines the desirable features of sanitary storage, proper cooling and quick and easy dispensing of any desired quantity in a butter dish or container which is pleasing in design and otherwise suitable for use in connection with table service in households, restaurants and hotels.

Broadly stated, the device by which I accomplish these results comprises a butter dish enclosing within its walls an open-topped chamber or cavity within which a tray, support or plunger is slidably positioned and suitable means, also preferably enclosed within the walls of the dish and thereby hidden from view, for sliding or pushing the plunger outwardly to expose a selected portion or all of the butter thereon beyond the open top of the chamber. For best results the open top of the chamber should be provided with doors adapted to be opened as the plunger or tray is slid outwardly and closed as the plunger is depressed.

The preservation or cooling of the butter may be effected in any suitable manner, for example by means of cracked ice or Dry Ice placed within the outer compartment of the dish, or by the use of a refrigerating coil of any well known type disposed within that compartment. Or the use of a refrigerant may be dispensed with and the storage cavity merely enclosed within a single wall or spaced double walls formed of or lined with any suitable heat-insulating material.

My invention resides in the structure and principle of operation and use of my device as a whole, irrespective of its form or configuration or the particular article stored within it. Although the specific embodiment illustrated is designed primarily as a butter dish, it is equally useful in this particular form or in other forms for the storage and dispensing of other food products such as cheese and fruits and of various beverages in bottles or glasses.

The construction and operation of my invention are clearly shown in the accompanying drawings, wherein:

Figure 3 is a similar view taken on line 3—3 of Figure 1.

Figure 4 is a central vertical sectional view of a modified form of the invention, and Figure 5 is a central vertical sectional view of a further modification showing my invention embodied in a cabinet form of device especially suitable for hotel and restaurant use.

Figure 1:
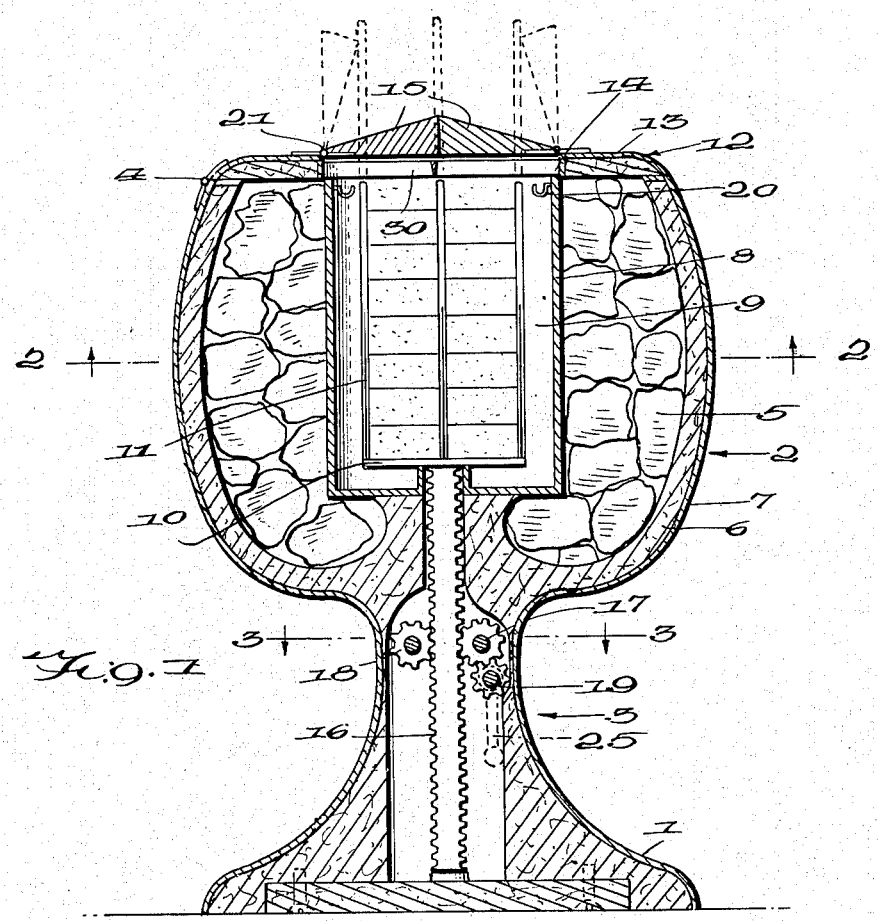
Figure 1 is a central vertical sectional view of my invention applied to a dish suitable for use on a table.
Figure 2:
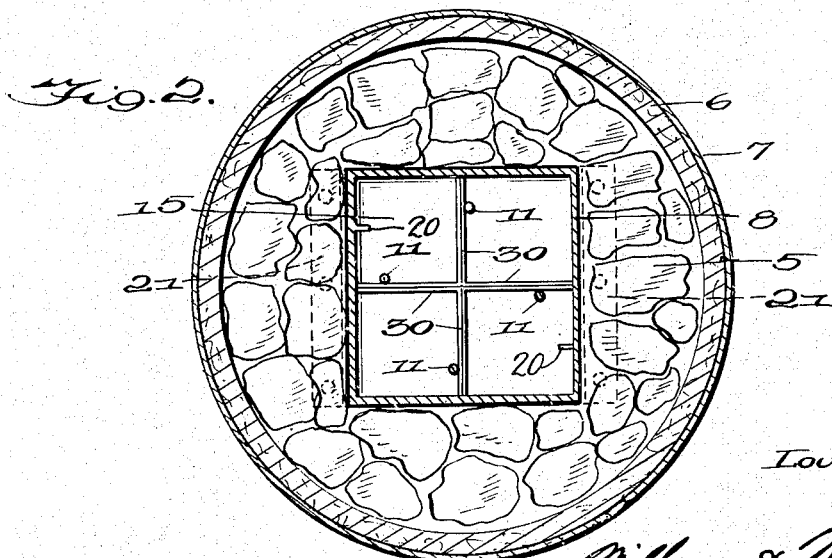
Figure 2 is a horizontal sectional view of the device taken on line 2—2 of Figure 1.

As illustrated in Fig. 1 my improved sanitary butter dish may take the form of a cup of more or less conventional and attractive design having a base 1, bowl 2 and stem 3. The cup may be made of glass, metal or any other suitable material, but for the sake of general attractiveness will preferably be formed of nickel or German silver. The bowl is preferably provided with a chamber 5 which may be used as a heat-insulating air space or for the reception of cracked ice, Dry Ice, refrigerant coil or other suitable refrigerating medium or device.

Chamber 5 is heat-insulated by suitable fibrous or other insulating material 6 lining the outer metal wall 7, the inner wall 8 being of thin metal and defining an inner storage chamber 9.

Within chamber 9 there is positioned a plunger 10 upon which the butter or other substance to be stored and dispensed is adapted to be placed. This plunger 10 is slidable within chamber 9 and may be raised therein to the top of the chamber and removed entirely therefrom for cleaning. In use the plunger 10 is raised gradually from its lower position to present one layer or portion of butter after another at or slightly above the top surface of the cup, and may be withdrawn into chamber 9 as soon as the desired quantity of butter has been obtained therefrom.

In order to maintain the butter upon the plunger 10 in proper position and prevent it from transverse movement which would interfere with the sliding dispensing movement of the plunger 10, the latter is preferably provided with spaced upstanding rods or bars 11.

For the greatest convenience in serving the pat of butter may be sliced transversely by the usual wire slicing frame or other suitable means and then placed upon plunger 10 within the bars 11. As the plunger is moved upwardly one horizontal layer after another may be exposed beyond the upper edge of chamber 9.

To provide access to the chamber 5, in the forms of the device in which ice or other refrigerant is used, the cup may be provided with a cover 12 secured by a suitable hinge 4 to the cup. The cover is provided with heat-insulating lining 13 which may be similar to the lining 6.

An aperture 14 in the cover registers with the chamber 9 and is preferably closed at its top by a pair of hinged doors 15. For convenience of operation the hinges 21 of these doors are offset, so that the doors will open easily when engaged by the tops of the upwardly sliding bars 11 and will remain in upstanding position inclined slightly inwardly while the bars extend beyond the top of the cup, the doors automatically closing when the plunger 10 and bars 11 are withdrawn into chamber 9.

The means for raising and lowering the support 10 is concealed within the dish or container and may be of any suitable mechanical construction that is adaptable to the structure and shape of the particular dish to which the invention is applied. In the butter cup which I have selected as an illustrative embodiment of my invention and as its preferred form of construction, a simple and efficient operating means comprises a rod 16 secured to the support 10 and having a rack formed upon its surface. Rod 16 is positioned between and in gear relation with a driving gear 17 and an idler gear 18. The gear 17 may be rotated manually either directly or through an intermediate gear 19 by a small hand crank 25 extended through an opening in the stem 3 of the cup. The elevator rod 16 is moved vertically by rotation of gear 17 and is held in proper vertical alignment between the gears 17 and 18, the latter being provided solely for this purpose. The elevator means is enclosed within the dish and is concealed from view, this being my preferred arrangement.

When the device is to be used for storing and dispensing butter a block or pat of butter is first sliced transversely into a plurality of parallel slices which form horizontal layers when the sliced block is placed on support 10 between bars 11. By turning crank 25 the support 10 is elevated gradually and as the bars 11 engage the hinged doors 15 they are opened and, if the butter is packed to the top of the bars, the top layer of butter will be immediately presented at the open top of the inner (storage) chamber 9. For greater convenience in serving it is preferable to provide means for further slicing the butter into squares as it is thus dispensed. For this purpose I secure in the open top of chamber 9 an open wire slicing frame which may be removably fastened to the cover 12 beneath the doors 15 by catches or any other suitable fastening means. This slicing frame is formed of crossed wires or blades 30 and, being open, permits the bars 11 to pass upwardly through it. The removable slicing frame may be omitted if desired.

The bars 11 terminate at or below the junction line of the bowl 2 and its cover 12, so that the cover may be raised without difficulty when the support 10 upon which bars 11 are carried is in its lowered position.

The support 10, when moved to any position by gear 17, is retained in its adjusted position through the frictional engagement of the gears and the rod 16. In cases where this frictional engagement may be insufficient, and especially in containers of large size and capacity a special stop means of conventional form associated with the gears or with crank 25 may be provided. This may take the form of a spring ring (not shown) bearing against the crank and functioning to hold the crank in adjusted position immediately it is released.

While my device may be made with the support 10 and its bars 11 fitting with a substantially snug sliding engagement within chamber 9, as in Fig. 4, the preferred form of my invention is slightly different in this respect, the inner chamber 9 being somewhat larger in cross-sectional area than the support 10, as illustrated in Fig. 1. The space between the chamber wall and bars 11 may be utilized for storage of the slicing frame or frames and butter tongs, which may be suspended on hooks 20 provided for this purpose.

The chamber 9 is preferably square or rectangular in cross-section, but may be circular or of any other desired shape, as the shape of this chamber forms no part of my invention. Also, when an outer chamber 5 is provided, it may likewise be of any suitable shape.

The device, whether formed with an outer chamber or merely with heat insulating walls enclosing the inner chamber, may be made in various sizes and shapes. The container illustrated in Fig. 1 is in the form of a butter dish or cup adapted and intended for table use.

In larger sizes the container may be made in cabinet form, as shown in Fig. 5. The cabinet device, as shown, is constructed in the same general manner as the table device shown in Fig. 1, the cabinet being preferably supported on legs 31 and the operating means for elevating the support being concealed within the lower part of the device. In this form of construction, generally of larger capacity, I prefer to use a refrigerating coil 50 to supply the refrigeration. The butter may be cut and placed in trays 40 slidably positioned on shelves 41 secured to bars 11 and removable when the support 10 is elevated. Or, if desired, the form of butter supporting and slicing means shown in Fig. 1 may be used in the cabinet form as well.

It is to be understood, of course, that the form of device shown in Fig. 5 may be used with ice instead of the refrigerating coil or even without a refrigerating medium of any kind, the heat-insulating walls, when refrigerant is used, acting to maintain foods or beverages of any kind within chamber 9 in their original hot or cold condition.

I claim:

1. A butter dish comprising walls defining an outer refrigerating chamber and an inner storage chamber open at its top, a support vertically slidable in said chamber, spaced bars on said support for retaining butter against transverse movement on said support, a hinged closure for the open top of said inner chamber adapted to be engaged and opened by said bars, and means for slidably moving said support.

2. A butter dish comprising walls defining an outer refrigerating chamber and an inner storage chamber open at its top, a support vertically slidable in said chamber, means carried by said support for retaining butter thereon, a closure for the open top of said inner chamber adapted to be engaged and opened by said retaining means, and means for slidably moving said support.

LOUIS H. REZOS.